United States Patent
Vidal et al.

(10) Patent No.: US 11,846,577 B2
(45) Date of Patent: Dec. 19, 2023

(54) SYSTEMS AND METHODS FOR COUNTING PARTICLES

(71) Applicant: miDiagnostics NV, Leuven (BE)

(72) Inventors: Rene Vidal, Baltimore, MD (US); Benjamin D. Haeffele, Oakland, CA (US); Florence Yellin, Baltimore, MD (US)

(73) Assignee: miDiagnostics NV, Heverlee (BE)

(*) Notice: Subject to any disclaimer, the term of this patent is extended or adjusted under 35 U.S.C. 154(b) by 0 days.

(21) Appl. No.: 17/835,814

(22) Filed: Jun. 8, 2022

(65) Prior Publication Data

US 2022/0299419 A1   Sep. 22, 2022

Related U.S. Application Data

(62) Division of application No. 16/619,201, filed as application No. PCT/US2018/036913 on Jun. 11, 2018, now Pat. No. 11,499,907.

(60) Provisional application No. 62/517,650, filed on Jun. 9, 2017.

(51) Int. Cl.
  *G01N 15/10*   (2006.01)
  *G06T 7/20*   (2017.01)

(52) U.S. Cl.
  CPC .............. *G01N 15/10* (2013.01); *G06T 7/20* (2013.01); *G01N 2015/1062* (2013.01); *G06T 2207/10016* (2013.01); *G06T 2207/30241* (2013.01)

(58) Field of Classification Search
  None
  See application file for complete search history.

(56) References Cited

U.S. PATENT DOCUMENTS

| | | | |
|---|---|---|---|
| 8,391,552 B1 | 3/2013 | Shaffer | |
| 2007/0159627 A1* | 7/2007 | Johnson | G01N 15/1459 356/335 |
| 2012/0147144 A1 | 6/2012 | Takahata et al. | |
| 2013/0157351 A1 | 6/2013 | Ozcan et al. | |
| 2014/0160236 A1 | 6/2014 | Ozcan et al. | |
| 2014/0177932 A1 | 6/2014 | Milne et al. | |
| 2018/0189963 A1* | 7/2018 | Joly | G01N 15/1459 |
| 2018/0231760 A1 | 8/2018 | Fradkin et al. | |

FOREIGN PATENT DOCUMENTS

| | | |
|---|---|---|
| WO | 2012004320 A1 | 1/2012 |
| WO | 2016174523 A1 | 11/2016 |

* cited by examiner

*Primary Examiner* — Vikkram Bali
(74) *Attorney, Agent, or Firm* — Hodgson Russ LLP

(57) ABSTRACT

Systems and methods are provided for counting particles in a fluid flow. In an aspect, coordinates of particles are obtained from video data of particles in a fluid, the video data made up of a sequence of image frames. The particle positions are linked in each pair of consecutive image frames of the video data. The linked particle positions are used to calculate particle trajectories through sequential image frames of the video data, and the particles are counted based on the particle trajectory. In another aspect, the particle positons within each image frame are transformed to estimated positions within a common coordinate frame. The estimated particle positions of a particle are grouped into a cluster center, and the particle count is calculated based on the cluster centers.

6 Claims, 6 Drawing Sheets

SYSTEMS AND METHODS FOR COUNTING PARTICLES

CROSS-REFERENCE TO RELATED APPLICATIONS

This application is a divisional of U.S. patent application Ser. No. 16/619,201, filed on Dec. 4, 2019, which is a National Phase of International Application No. PCT/US2018/036913, filed on Jun. 9, 2018, which claims priority to U.S. Provisional Application No. 62/517,650, filed on Jun. 9, 2017, the disclosures of each of which are incorporated herein by reference.

FIELD OF THE DISCLOSURE

The present disclosure relates generally to improved systems and methods for counting particles in a fluid.

BACKGROUND OF THE DISCLOSURE

Counting particles in a fluid has many important applications, including, for example, counting the number of cells in a biological sample. In a video capturing fluid flowing through a fluid passage, particles (for example, cells, etc.) in the fluid may each appear in multiple image frames of the video. When counting the particles in the fluid, a primary challenge is to count each particle only one time (and not multiple times if the particle appears in multiple image frames). There is an ongoing and unmet need for improved systems and methods for detecting, and/or counting, and/or identifying, and/or quantifying cells in the fluid.

BRIEF SUMMARY OF THE DISCLOSURE

The present disclosure may be embodied as a method of counting particles in a fluid. The method may include capturing video data of a flowing liquid that has suspended, dissolved therein, and/or otherwise includes particles. The video data is made up of a sequence of image frames taken over time. The video data may be captured using a lens-free imager. The method may also include detecting particles within each image frame of the sequence of image frames.

The method includes obtaining a set of (x,y) coordinates corresponding to particle centers in video data. Each set of (x,y) coordinates corresponds to an image frame of the video data. A coordinate of each particle center in an image frame is linked to a coordinate of the particle center in the consecutive image frame by fitting the coordinates to a statistical model of particle displacements. For example, a transform may be computed to describe particle displacement between consecutive image frames. The particle centers may be linked in the forward direction (estimating a position in a second image frame based on the coordinates of the particle center in a first image frame) and/or the reverse direction (estimating a position in the first frame based on the coordinates in the second frame). Particle centers in each pair of consecutive image frames are matched in this way. A trajectory of each particle is tracked through links in each sequential image frame based on the links of particle centers in consecutive pairs of image frames. Each particle is tracked until the particle center is not linked in a next image frame. A length of each tracked particle trajectory is calculated, and the particle count is calculated based on the tracked particle trajectories. The particle count may be calculated by a linear regression having regression coefficients learned by comparing to known cell counts.

In another aspect, the present disclosure may be embodied as a system for counting particles in a fluid. The system includes a flow cell having a fluid passage. A lens-free image sensor is configured to obtain holographic images of a fluid in the fluid passage. The system may also include a coherent light source for illuminating at least a portion of the fluid passage. The system includes a processor in communication with the image sensor. The processor is programmed to capture video data of particles within the fluid using the image sensor, where the video data is made up of a sequence of images (image frames of the video data) captured by the image sensor over time. The processor is programmed to obtain a set of (x,y) coordinates corresponding to particle centers in the video data, where each set of (x,y) coordinates corresponds to an image frame of the video data. The processor is programmed to link a coordinate of each particle in each pair of consecutive image frames by fitting the coordinates to a statistical model of particle displacements; track a trajectory of each particle through links in each sequential image frame until the particle is not linked in a next image frame; calculate a length of the tracked particle trajectory; and calculate a particle count based on the tracked particle trajectories.

In another aspect, the present disclosure may be embodied as a non-transitory computer-readable medium having stored thereon a computer program for instructing a computer to obtain a set of (x,y) coordinates corresponding to particle centers in video data, where each set of (x,y) coordinates corresponds to an image frame of the video data. The computer program further instructs the computer to link a coordinate of each particle in each pair of consecutive image frames by fitting the coordinates to a statistical model of particle displacements; track a trajectory of each particle through links in each sequential image frame until the particle is not linked in a next image frame; calculate a length of the tracked particle trajectory; and calculate a particle count based on the tracked particle trajectories.

In another aspect of the present disclosure, a method of counting particles in a fluid is provided. The method includes obtaining a set of (x,y) coordinates corresponding to particle centers in video data, where the video data comprises a sequence of image frames and each set of (x,y) coordinates corresponds to an image frame. Each particle center of each image frame is transformed to an expected particle center in a common coordinate frame. For example, a transform may be computed for describing particle displacement between consecutive image frames. The transformed particle centers are grouped into cluster centers. A particle count is calculated based on the number of cluster centers.

In another aspect, the present disclosure may be embodied as a system for counting particles in a fluid. The system includes a flow cell having a fluid passage. A lens-free image sensor is configured to obtain holographic images of a fluid in the fluid passage. The system may also include a coherent light source for illuminating at least a portion of the fluid passage. The system includes a processor in communication with the image sensor. The processor is programmed to capture video data of particles within the fluid using the image sensor, where the video data comprises a sequence of image frames. The processor is programmed to obtain a set of (x,y) coordinates corresponding to particle centers in the video data, where each set of (x,y) coordinates corresponds with an image frame of the video data. The processor is programmed to transform each particle center of each image frame to an expected particle center in a common coordinate frame; group the transformed particle centers into cluster centers; and calculate the particle count based on the number of cluster centers.

In another aspect, the present disclosure may be embodied as a non-transitory computer-readable medium having stored thereon a computer program for instructing a computer to obtain a set of (x,y) coordinates corresponding to particle centers in the video data, where each set of (x,y) coordinates corresponds with an image frame of the video data. The computer is further instructed to transform each particle center of each image frame to an expected particle center in a common coordinate frame; group the transformed particle centers into cluster centers; and calculate the particle count based on the number of cluster centers.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
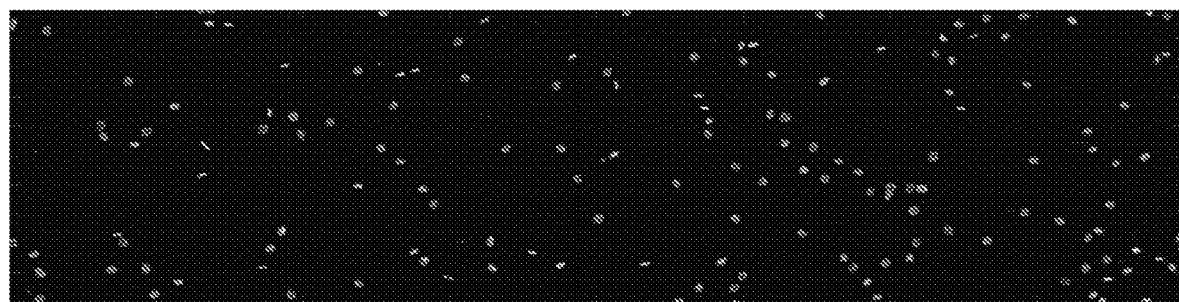
FIG. 1 is an example image frame taken from video data of a cells in a flowing fluid.
Figure 2:
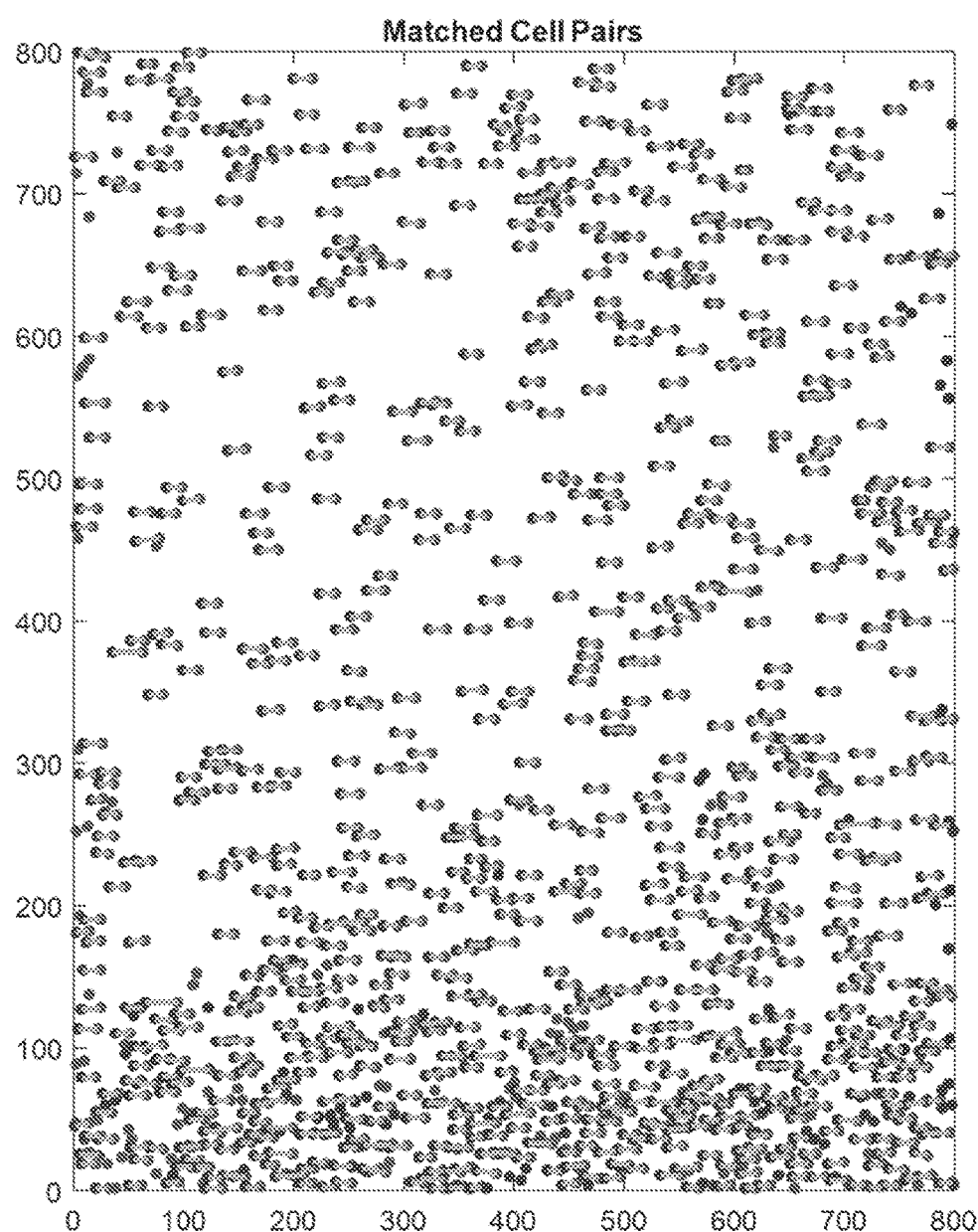
FIG. 2 depicts example estimated linkages, where a pair of dark points are connected by a lighter-shaded linkage, one dark point of each pair (in this depicted example, generally the left point of each pair) corresponds to the detected particle locations in a first image frame, and the other dark point of each pair corresponds to the detected particle locations in a second image frame, and the lighter-shaded linkage indicates that a linkage was estimated to exist between the two points.

The present disclosure is directed to systems and methods useful for, among other things, counting particles in a liquid. As such it is applicable to a wide variety of applications wherein analysis of samples comprising particles is desirable. For example, the particles may be cells in a biological sample.

The present disclosure provides systems and methods for counting particles, such as, for example, blood cells in blood flowing in a microfluidic chamber, using video data (i.e., consecutive image frames captured over time). The described techniques are applicable to many imaging modalities, with conventional light-field microscopy and lens-free imaging (LFI) being particular non-limiting examples. As a particle moves through a microfluidic chamber it can appear in multiple images of the video. As such, for counting particles in a flowing liquid using video data, a primary challenge is to ensure that each particle is counted only once and not counted multiple times if the particle appears in multiple image frames.

In some embodiments, the disclosure pertains to any technique whereby particles (e.g., cells) in a liquid sample are subjected to a flow of that sample and are characterized during flow in connection with certain parameters, including but not limited to, the number of cells, the type of cells, the morphology of cells, cell surface markers, internal cell markers, and other characteristics that will be apparent to those skilled in the art, given the benefit of the present disclosure. Aspects disclosed herein can be useful in flow cytometry and any other type of cell sorting, including but not necessarily limited to single cell sorting, fluorescence activated cell sorting (FACS) and variations thereof, and magnetic cell sorting. In embodiments the disclosure facilitates improved particle counting.

Any improvement facilitated by the presently provided systems and/or methods can be compared to a suitable reference value and may accordingly demonstrate an improvement relative to the reference value. In embodiments an improvement relative to a reference value comprises an improvement of between 1-100%, inclusive, and including all numbers there between. Additional improvements can include any multiple of a reference value that is greater than 100%. In embodiments, the disclosure provides an improvement in particle counting relative to a suitable reference value.

In embodiments the disclosure pertains to counting particles from any source, including cells from any biological source. Non-limiting examples of such biological sources include whole blood, blood plasma, lymph, cerebrospinal fluid, seminal fluid, lacrimal secretions, urine, and other biological liquids. In embodiments, the cells are obtained from a tissue sample and are processed for use in systems and/or methods of the disclosure. In embodiments the disclosure provides information about cells that is useful for numerous applications in, for example, the fields of genetics, transplantation/determinations of immune status, hematology, determination of cell phenotypes, cancers and other disease diagnostics, microbiological applications, veterinary purposes, and other uses that will be apparent to those skilled in the art.

In one embodiment the disclosure comprises processing a biological sample using a device and/or system as described herein for determining characteristics and/or the number of cells in a flowing liquid. The disclosure includes integration with computer-based analysis for, among other purposes, imaging and generating information about cell characteristics and/or cell numbers from the imaging approaches. In embodiments, the disclosure is used in conjunction with any subject matter described in PCT Application No. PCT/US2017/059933, PCT Application No. PCT/US2017/059931, and/or U.S. application Ser. No. 15/802,779, wherein the entire disclosures of each of said applications are incorporated herein by reference. In embodiments, the disclosure further comprises fixing information regarding cell characteristics and/or cell numbers obtained using a method/system/device of this disclosure in a tangible non-transient medium, and includes such media. In embodiments, the disclosure comprises communicating information regarding cell characteristics and/or cell numbers to, for example, a database, over the internet, into a form of cloud storage, and/or to a health care provider.

Estimate Particle Counts from Particle Trajectories

In a first aspect, the steps of a method of the present disclosure includes the following steps:

- Collect video data recorded from particles in a liquid flowing in a microfluidic chamber and detect potential locations of particles in each image frame independently.
- Fit the displacements of the particles from frame-to-frame via a statistical model of the particle displacements to build linkages between potential detection locations in two consecutive image frames.
- Use the linkages between the frame-to-frame detections to calculate statistics of tracked particles.
- Calculate the number of total particles either via a) a linear regression of the tracked particle statistics to estimate the number of particles or b) back-projecting the locations of the potential particle detections to a common reference frame and then do clustering of the detected point clouds.

Figure 6:
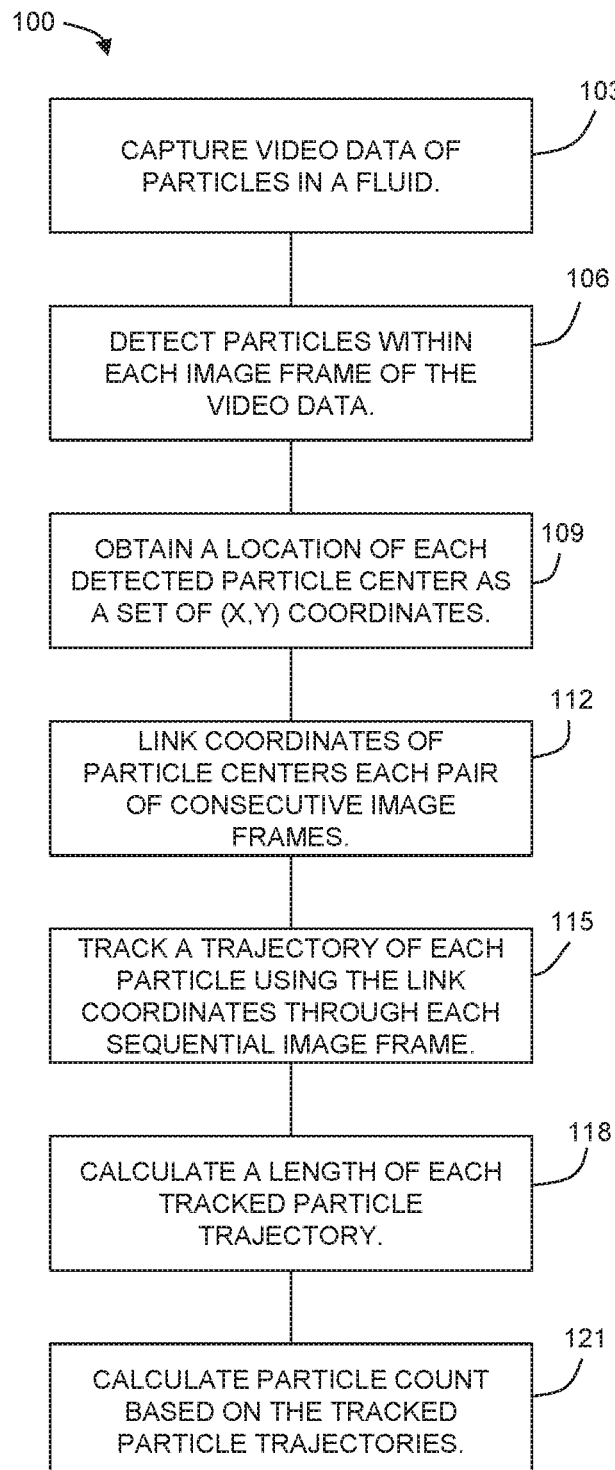
FIG. 6 depicts a method according to an embodiment of the present disclosure.

In an embodiment, the present disclosure may be embodied as a method 100 of counting particles in a fluid (see, e.g., FIG. 6). The method 100 may include capturing 103 a video of a flow of a fluid including particles, where the captured 103 video is made up of a sequence of image frames taken over time. The video data may be captured via any modality for recording such video provided that the modality allows for the detection of locations (or approximate locations) of individual particles (i.e., particle centers) within each image frame of the sequence of image frames. As such, the method 100 may include detecting 106 particles within each image frame of the sequence and, for each image frame, obtaining 109 a location of each detected 106 particle center as an (x,y) coordinate. In this way, a set of (x,y) coordinates is obtained 109 for the particles of each image frame, wherein the number of coordinates in each set corresponds with the number of particles detected in the associated image frame. Note that for convenience throughout this disclosure, a particle location will be referenced by the location of the center of the particle. However, the particle location may be otherwise defined and such location definition is within the scope of the disclosure.

Statistical Model of the Cell Displacements

Once potential particle center locations have been obtained, the method 100 includes linking 112 coordinates of particle centers in a pair of consecutive image frames. Because the video data comprises an ordered sequence of image frames, consecutive image frames may be considered to be pairs of consecutive image frames. For example, in video data comprising image frame 1, image frame 2, image frame 3, and image frame 4, a first pair of consecutive image frames is made up of image frame 1 and image frame 2, a second pair is image frame 2 and image frame 3, and a third pair is image frame 3 and image frame 4. Because the particles of interest are flowing (i.e., moving), the particle centers are expected to be displaced from frame-to-frame. Linking 112 a potential particle center in consecutive pairs of image frames includes matching a location of a particle in the first image frame of the pair to a displaced location of the same particle in the second image frame of the pair. More specifically, given the coordinates of a particle detection from the first frame, $(x_1, y_1)$, the distribution of the coordinates of a particle detection in the second frame, $(x_2, y_2)$ may be modeled as independent displacements in the x and y directions:

$$p_{x,y}(x_2-x_1, y_2-y_1 | x_1, y_1, s) = p_x(x_2-x_1 | x_1, s) p_y(y_2-y_1 | y_1, s) \quad (1)$$

where $s=\{-1,1\}$ is a parameter to indicates if the flow of the liquid results in movement of the particles from left-to-right or right-to-left. (Note that this example technique is trivially adapted to flows in the vertical direction.)

In particular, it may be assumed that $p_x$ and $p_y$ are from an Exponential family distribution, and in a non-limiting example, a Gamma distribution may be used for $p_x$ and a Normal distribution may be used for $p_y$ (though other distributions may be used):

$$p_x(x_2 - x_1 | x_1, s) \sim \text{Gamma}(\alpha, \beta) = \begin{cases} \frac{1}{\Gamma(\alpha)\beta^\alpha}(s(x_2-x_1))^{\alpha-1}e^{-\frac{s(x_2-x_1)}{\beta}} & s(x_2-x_1) > 0 \\ 0 & \text{else} \end{cases} \quad (2)$$

$$p_x(x_2 - x_1 | x_1, s) \sim N(\mu, \sigma) = \frac{1}{\sqrt{2\pi\sigma^2}} e^{-\frac{(s(y_2-y_1)-\mu)^2}{2\sigma^2}} \quad (3)$$

Given this statistical model, proposed linkages 112 between particle detections in two consecutive frames may be made by assuming that the displacements of the particles are independent and maximizing the likelihood of the model. More specifically, if there are $N_1$ detections in the first frame and $N_2$ detections in the second frame, then potential linkages from the first frame to the second frame, $L^f \in \{1, \ldots, N_2\}^{N_1}$, may be estimated by solving the problem:

$$\underset{L^f \in \{1,\ldots,N_2\}^{N_1}}{\text{argmax}} \prod_{i=1}^{N_1} p_x(x_2[L_i^f] - x_1[i] | x_1[i], s) p_y(y_2[L_i^f] - y_1[i] | y_1[i], s) = \quad (4)$$

$$\underset{L^f \in \{1,\ldots,N_2\}^{N_1}}{\text{argmin}} - \quad (5)$$

$$\ln\left(\prod_{i=1}^{N_1} p_x(x_2[L_i^f] - x_1[i] | x_1[i], s) p_y(y_2[L_i^f] - y_1[i] | y_1[i], s)\right) =$$

$$\underset{L^f \in \{1,\ldots,N_2\}^{N_1}}{\text{argmin}} \sum_{i=1}^{N_1} \left[(1-\alpha)\ln(s(x_2[L_i^f] - x_1[i])) + \frac{s(x_2[L_i^f] - x_1[i])}{\beta} + \frac{(s(y_2[L_i^f] - y_1[i]) - \mu)^2}{(2\sigma^2)}\right] \quad (6)$$

subject to $s(x_2[L_i^f] - x_1[i]) > 0 \; \forall i$ where $(x_1[i], y_1[i])$ denotes the $i^{th}$ detected particle in the first frame and $(x_2[L_i^f], y_2[L_i^f])$ denotes the detected particle in the second frame that was linked from the first frame.

Likewise, linkages are determined in the reverse direction, $L^b \in \{1, \ldots, N_1\}^{N_2}$—i.e., from the second frame of the pair of image frames to the first frame—by solving a problem equivalent to (6) of the form:

$$\underset{L^b \in \{1,\ldots,N_1\}^{N_2}}{\text{argmin}} \sum_{i=1}^{N_2} \left[(1-\alpha)\ln(s(x_2[i] - x_1[L_i^b])) + \frac{s(x_2[i] - x_1[L_i^b])}{\beta} + \frac{(s(y_2[i] - y_1[L_i^b]) - \mu)^2}{(2\sigma^2)}\right] \quad (7)$$

-continued $$\text{subject to } s(x_2[i] - x_1[L_i^b]) > 0 \ \forall \ i$$

In some embodiments, once the optimization problems in (6) and (7) have been solved, linkages 112 between particles may be considered to be valid if the links in the forward direction match the links in the reverse direction. In particular, a link between detection i in the first frame and detection j in the second frame is considered valid if it satisfies the following two conditions are satisfied:

$$i = L_j^b \quad (8)$$

$$j = L_i^f$$

Fitting the Parameters of the Distributions

Figure 3A:
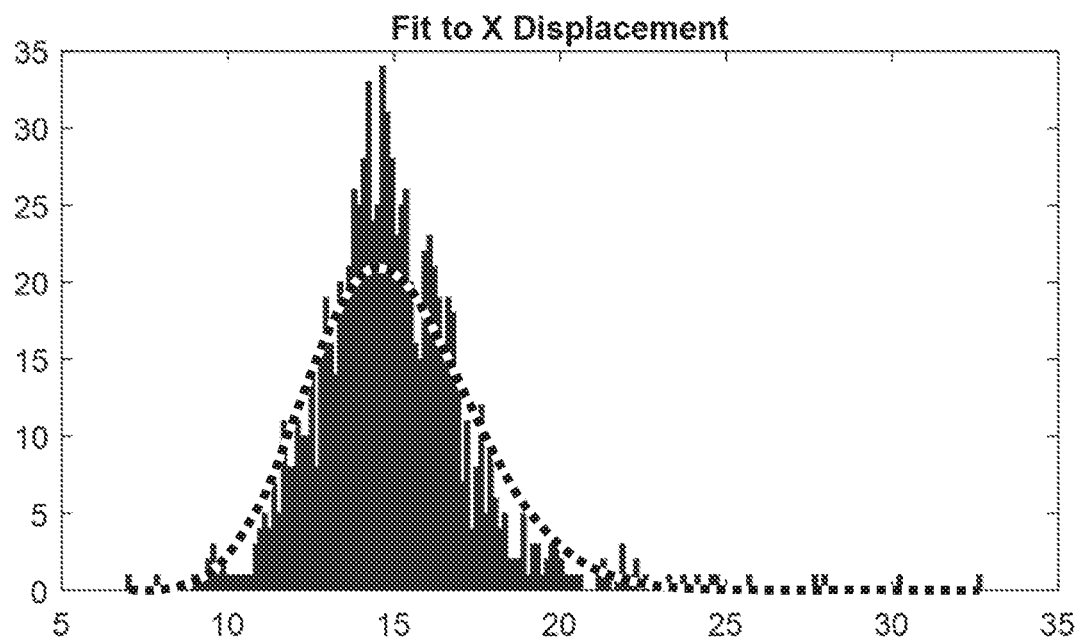
FIG. 3A is a histogram showing the X displacements of the linked points of FIG. 2, and the fitted distribution (dashed curve).
Figure 3B:
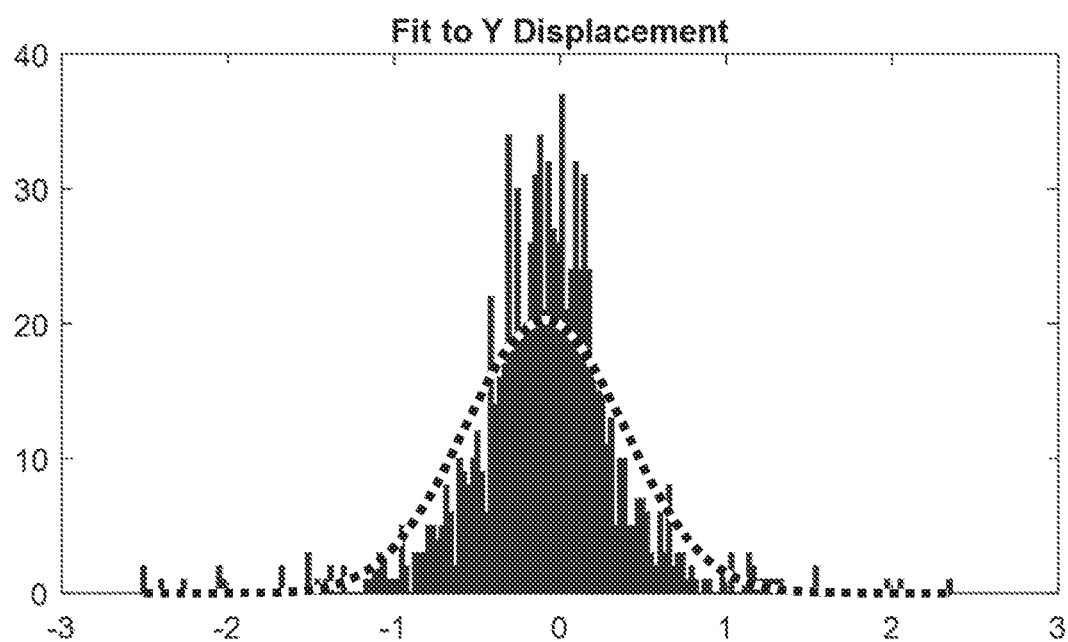
FIG. 3B is a histogram showing the Y displacements of the linked points of FIG. 2, and a fitted distribution (dash curve).

In the above discussion about finding the linkages, it was assumed that the parameters of the statistical distributions for $p_x$ and $p_y$ were known. In general, these are not known and it may be necessary to fit these based on the data. To do this an Expectation Maximization strategy may be employed, which starts with an initial value for the parameters (which may be, for example, initial estimates based on a priori knowledge of the sample, or other initial values as will be apparent to one having skill in the art), then estimates the linkages as described above. Using the set of estimated linkages we then estimate the parameters of the distribution to maximize the likelihood of the data given the linkages. This is then repeated until convergence. FIGS. 3A and 3B (right) shows example of estimated linkages between two consecutive frames along with the fitted distributions for $p_x$ and $p_y$.

Calculating Tracked Particle Statistics

Once the linkages 112 have been estimated for each pair of consecutive frames in the video, statistics of the tracked particle trajectories may be compiled. More specifically, for each frame the set of detections that did not link to a prior frame is found (or, for the first frame of the video, then beginning with all of the detections). Then, for each starting detection, a path of linkages is tracked 115 from frame-to-frame until the detected particle fails to link with a detection in the next frame (or the final frame of the video is reached). From the set of all such trajectories, the length of the tracked particle trajectories are calculated 118, defined as $$d(T_i) = \sqrt{(x_{start_i} - x_{stop_i})^2 + (y_{start_i} - y_{stop_i})^2} \quad (9)$$

where $(x_{start_i}, y_{start_i})$ and $(x_{stop_i}, y_{stop_i})$ denote the starting and stopping coordinates, respectively, of trajectory i.

Estimate Particle Counts from Tracked Particle Statistics

Figure 4:
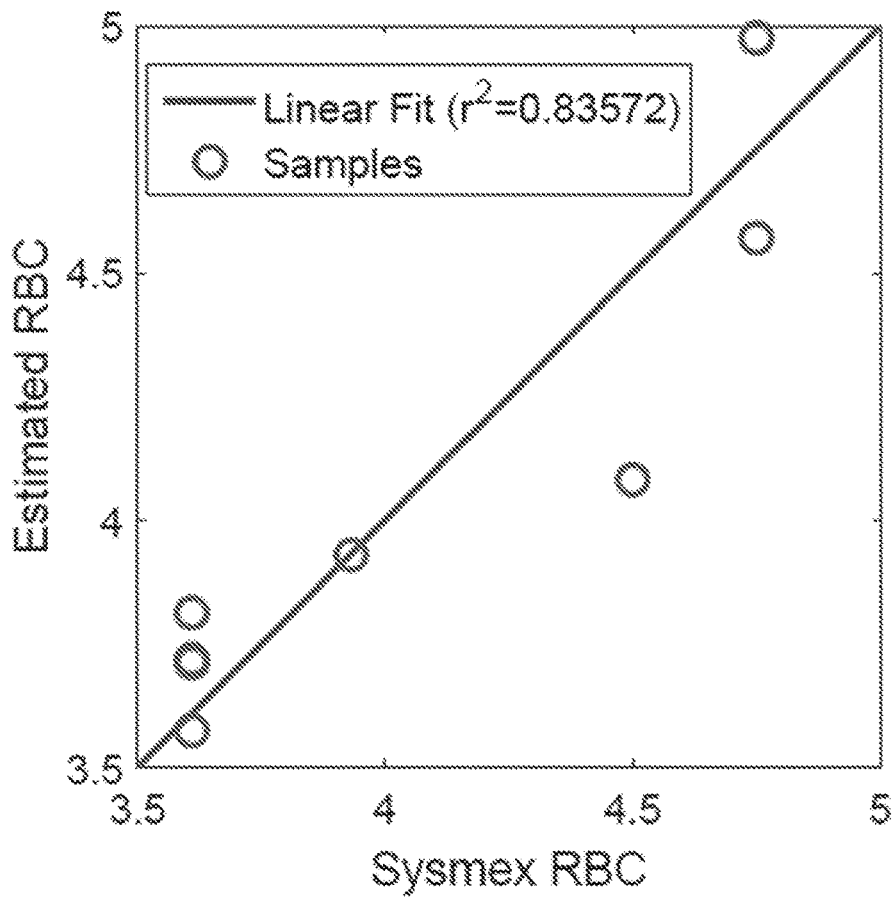
FIG. 4 depicts a linear correlation of estimated RBC concentrations estimate versus true RBC concentrations as measured by Sysmex hematology analyzer ($r^2$=0.83572).

The particle count may then be calculated 121 based on the tracked particle trajectories. Ideally, if each particle in the video was perfectly tracked, then the trajectories for each particle, $d(T_i)$, would be approximately equal to the length of the microfluidic channel that is imaged in the video. However, due to errors in the particle tracking, it is very likely that not every trajectory will perfectly follow a particle from one end of the microfluidic channel to the other, and breaks will likely occur in the trajectories. As a result, one strategy that can be employed to estimate the total number of tracked particles is linear regression on the tracked particle statistics. More specifically, the number of particles in a sample may be estimated via the linear regression given by $$\text{Predicted Cell Count} = m \sum_{i=1}^{N} \frac{d(T_i)}{\text{Length of Channel}} + b \quad (10)$$

where N is the total number of trajectories in the video data and (m,b) are regression coefficients that are learned by comparing the estimated particle counts with those obtained via, for example, a laboratory hematology analyzer on a known volume of human blood. FIG. 4 below shows the close correspondence between the linear regression and true particle counts as measured by a laboratory hematology analyzer (Sysmex).

Estimate Particle Counts from Common Reference Frame

Figure 8:
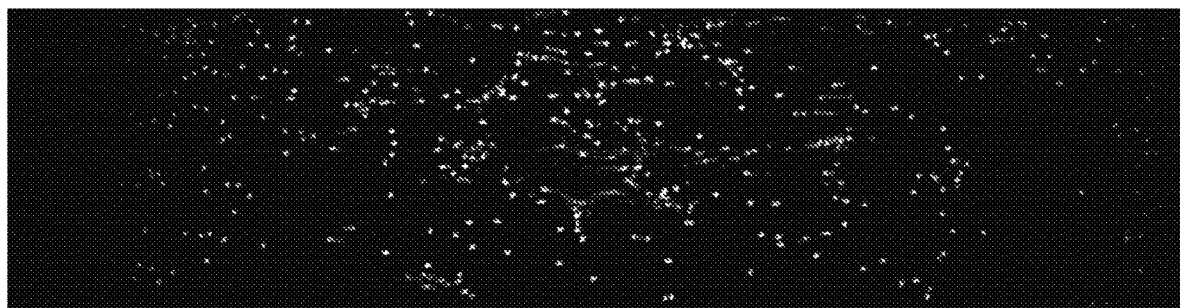
FIG. 8 is a panorama generated by combining 15 image frames.

In a second aspect, the disclosure provides a method that includes the following steps:

1. Compute transforms. Given pairs of consecutive image frames of a video with the particle centers and linkages known, compute a mathematical transform that maps coordinates from one frame into the next consecutive frames. Because the movement/flow pattern of particles can be complex, a non-linear transform is advantageous to accurately describe how points in one image frame transform into points in another image frame.
2. Transform particle centers. Using the known particle centers in each image frame and the computed non-linear transformations between pairs of image frames, transform all particle centers into a single coordinate frame, such as, for example, the coordinate frame of the final image frame of the video. A combined image in the common coordinate frame may be considered a panoramic image (see, e.g., FIG. 8).
3. Cluster transformed centers. Cluster the transformed particle centers and count the number of clusters. Ideally, the number of clusters is equal to the number of particles in the video, where each particle is counted only once, regardless of how many frames the particle appears in.

Particle Capture and Detection

Figure 7:
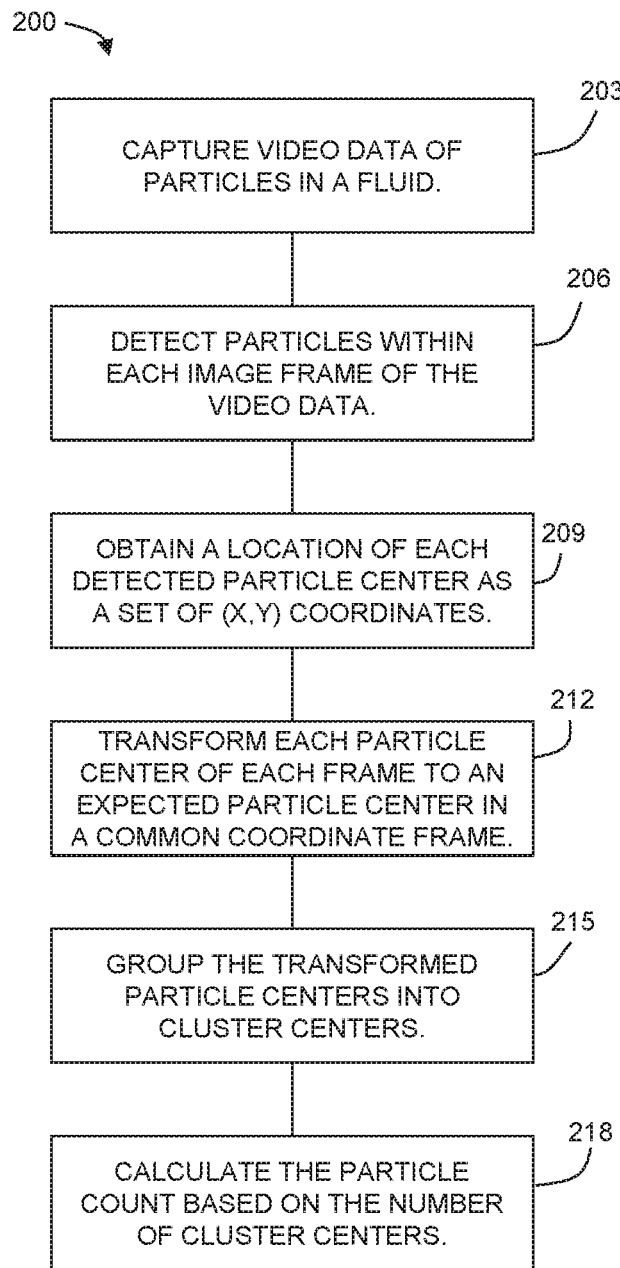
FIG. 7 depicts a method according to another embodiment of the present disclosure.

The present disclosure may be embodied as a method 200 that can be useful for counting particles in a flowing fluid (see, e.g., FIG. 7). Similar to the method described above, the method 200 may include capturing 203 a video of particles in a flowing fluid, where the captured 203 video is made up of a sequence of image frames taken over time. The video data may be captured via any modality for recording such video provided that the modality allows for the detection of locations (or approximate locations) of individual particles within each image frame of the sequence of image frames. As such, the method 200 may include detecting 206 particles within each image frame of the sequence and, for each image frame, obtaining 209 a location of each detected 106 particle as an (x,y) coordinate. In this way, a set of (x,y) coordinates is obtained 209 for the particles of each image frame, wherein the number of coordinates in each set corresponds with the number of particles detected in the associated image frame.

Compute Transforms

Each particle center of each frame is transformed 212 to an expected particle center in a common coordinate frame. The flow/movement of particles (for example, biological cells) can be complex, and a non-linear transform may be advantageous in modeling the displacement of particles between consecutive frames. In some embodiments, to compute the particle displacement transforms, a thin plate spline (TPS) transform may be used between consecutive image frames. The TPS transform describes how any point (x,y) in the first frame is transformed to (x', y') in the second frame:

$$\begin{bmatrix} x' \\ y' \end{bmatrix} = f\left(\begin{bmatrix} x \\ y \end{bmatrix}\right) = \begin{bmatrix} a_{x1} & a_{x2} & a_{x3} \\ a_{y1} & a_{y2} & a_{y3} \end{bmatrix} \begin{bmatrix} x \\ y \\ 1 \end{bmatrix} + \sum_{i=1}^{N} \begin{bmatrix} c_{xi} \\ c_{yi} \end{bmatrix} \phi\left(\left\| \begin{bmatrix} x - x_1[i] \\ y - y_1[i] \end{bmatrix} \right\|\right) \quad (11)$$

The points $(x_1[i], y_1[i])_{i=1}^N$ are the detected particle centers in the first frame, and $\phi(r) = r^2 \log r$ is the radial basis function. A point in the first frame undergoes an affine transform determined by the six coefficients of the matrix $$A = \begin{bmatrix} a_{x1} & a_{x2} & a_{x3} \\ a_{y1} & a_{y2} & a_{y3} \end{bmatrix},$$

plus a non-linear transform that involves 2N coefficients $$C = \begin{bmatrix} c_{x_1} & \cdots & c_{x_N} \\ c_{y_1} & \cdots & a_{y_N} \end{bmatrix}.$$

Computing the TPS transform between two frames amounts to solving for the 2×(3+N) coefficients of the transform.

Note that due to the TPS model, there are more model coefficients then there are tracked data points. As a result, prior assumptions are made regarding the transformation to solve the problem. In particular, it is assumed that the transformation is locally smooth, and the coefficients are found by solving a regularized least squares problem which penalizes non-smooth transformations by integrating the Laplacian on the transformation. In the equation below, this regularization is added for smoothing, and the parameter λ controls the trade-off between the data integrity and smoothness of the transform.

$$\min_{A,C} \frac{1}{N} \sum_{i=1}^{N} \left\| \begin{bmatrix} x_2[i] \\ y_2[i] \end{bmatrix} - f\left(\begin{bmatrix} x_1[i] \\ y_1[i] \end{bmatrix}\right) \right\|_2^2 + \lambda \int\int (f_{xx}^2 + 2f_{xy}^2 + f_{yy}^2) dx dy \quad (12)$$

Transform Particle Centers

Let the video data comprise T image frames, where f(t) transforms points in image frame t to points in image frame t+1. After the coefficients of all $\{f^{(t)}\}_{t=1}^{T-1}$ transforms are found, the detected particle centers in each image frame are transformed 212 into the common coordinate frame's coordinates (where the common coordinate frame is, for example, the last image frame). For example, the particle center $(x_t, y_t)$ in image frame t will be transformed into common coordinate frame T as follows:

$$\begin{bmatrix} x_T \\ y_T \end{bmatrix} = f^{(T-1)}\left(\ldots\left(f^{(t+1)}\left(f^{(t)}\left(\begin{bmatrix} x_t \\ y_t \end{bmatrix}\right)\right)\right)\ldots\right). \quad (13)$$

All detected particles from all frames are transformed 212 accordingly, so that common coordinate frame T contains one particle center for each particle detection in the video data.

Cluster Transformed Centers

A single particle will appear in multiple image frames of the video data; therefore, the total number of particle centers transformed into the final frame will exceed the true number of distinct particles. Ideally, the coordinates of a single particle that appears in multiple image frames will all be transformed to the same location in the common coordinate frame T. In reality, however, there will be some error in the transformations computed, so the coordinates for a single particle that appears in multiple image frames will be transformed into a cluster of points in frame T. The number of distinct particles in the video is thus equal to the number of clusters in frame T.

Figure 9:
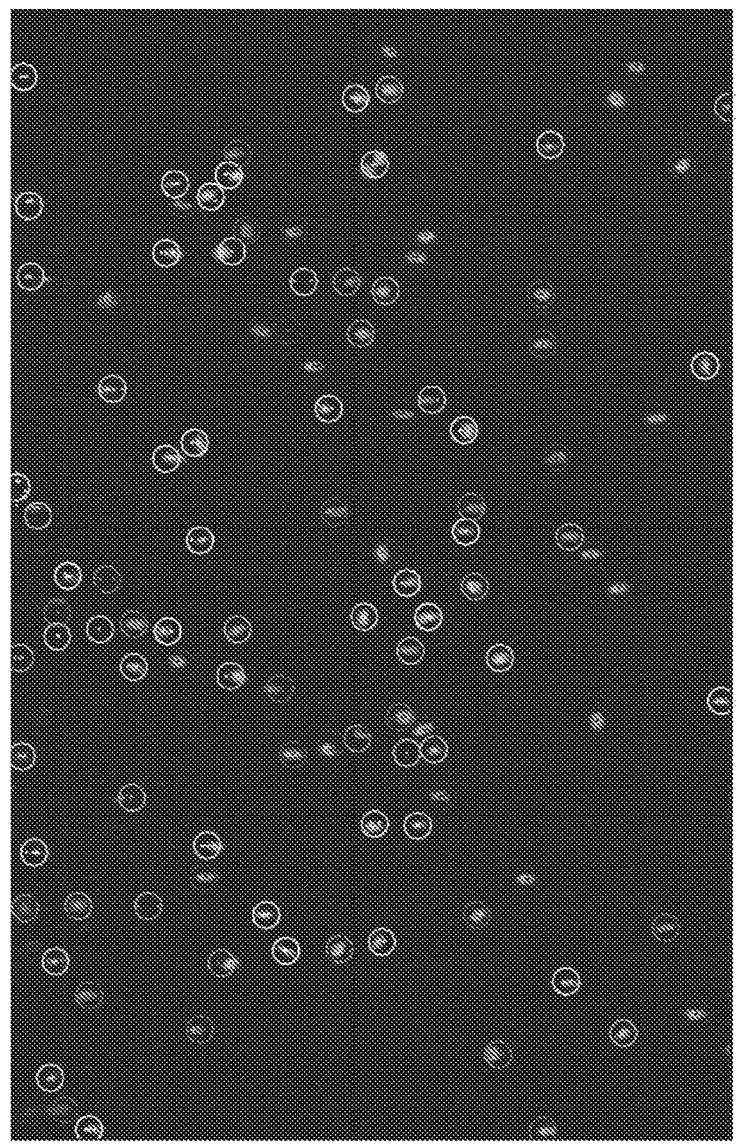
FIG. 9 depicts clustered cells in a common reference frame.

As such, the transformed particle centers in the common coordinate frame are grouped 215 into clusters (described as cluster centers). FIG. 9 depicts an image showing particles grouped into clusters. To find the number of clusters in frame T after all particle centers $\{x_t[i], y_t[i]\}_{t=1:N_t}^{t=1:T}$ have been transformed, the particle centers are grouped 215 by, for example, mean shift clustering with a uniform kernel. Mean shift clustering searches for the local maxima in the distribution of particle centers using an iterative approach. At the $(j+1)^{th}$ iteration, the estimate of a cluster center $(x_c^j, y_c^j)$ is updated as follows:

$$\begin{bmatrix} x_c^{j+1} \\ y_c^{j+1} \end{bmatrix} = \frac{1}{\|\Omega([x_c^j, y_c^j])\|_0} \sum_{i \in \Omega([x_c^j, y_c^j])} \begin{bmatrix} x[i] \\ y[i] \end{bmatrix}, \quad (14)$$

$$\Omega([x_c^j, y_c^j]) = \{(x[i], y[i]) : \|(x[i], y[i]) - (x_c^j, y_c^j)\|_2 \leq h\} \quad (15)$$

Cluster centers are merged together and reinitialized when appropriate. The kernel bandwidth h is a model parameter that effects the number of local maxima found, with a larger bandwidth resulting in fewer local maxima. After convergence, the method 200 includes determining 218 the particle count based on the number of cluster centers. For example, the number of cluster centers is equal to the estimated number of distinct particles in the video.

Figure 5:
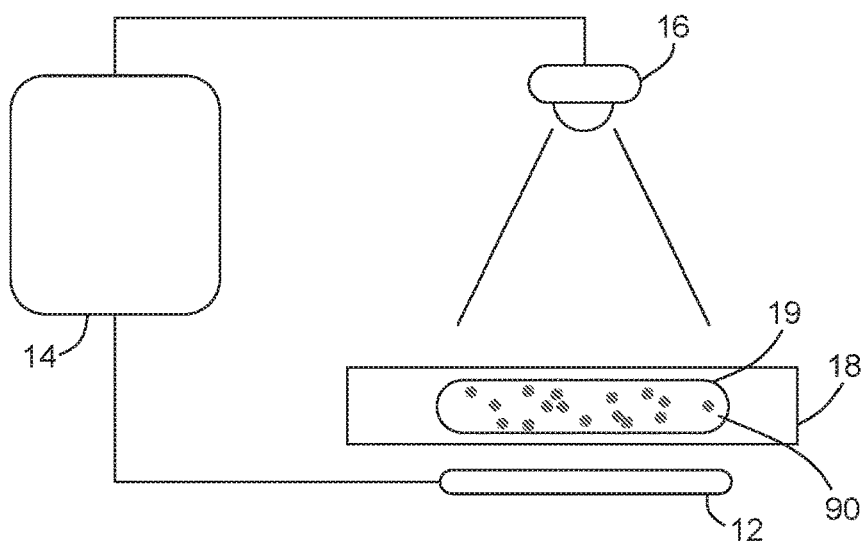
FIG. 5 depicts a system according to an embodiment of the present disclosure.

In another aspect, the disclosure may be embodied as a system 10 that can be useful for counting particles in a fluid (see, e.g., FIG. 5). The system 10 comprises a flow cell 18 having a fluid passage 19. For example, the fluid passage 19 may be a tube or a micro-fluidic channel through which the fluid 90 may flow. The system 10 may have an image sensor 12. In some embodiments, the image sensor 12 is a lens-free image sensor for obtaining holographic images. The image sensor 12 may be, for example, an active pixel sensor, a charge-coupled device (CCD), or a CMOS active pixel sensor. The system 10 may further include a light source 16, such as a coherent light source. The image sensor 12 is configured to obtain video data of the fluid 90 while the fluid is flowing through the fluid passage 19. The fluid 90 may be illuminated by light from the light source 16, when the image sensor 12 is actuated. In embodiments where the image sensor 12 is a lens-free image sensor, the captured video data may comprise a sequence of holographic image frames. A processor 14 may be in communication with the image sensor 12.

The processor 14 may be programmed to perform any of the methods of the present disclosure. For example, the processor 14 may be programmed to capture video data of particles within the fluid using the image sensor, the video data comprising a sequence of image frames; obtain a set of (x,y) coordinates corresponding to particle centers in the video data, each set of (x,y) coordinates corresponding to an image frame of the video data; link a coordinate of each particle in each pair of consecutive image frames by fitting the coordinates to a statistical model of particle displacements; track a trajectory of each particle through links in each sequential image frame until the particle is not linked in a next image frame; calculate a length of the tracked particle trajectory; and calculate a particle count based on the tracked particle trajectories. In another example, the processor 14 may be programmed to capture video data of particles within the fluid using the image sensor, the video data comprising a sequence of image frames; obtain a set of (x,y) coordinates corresponding to particle centers in the video data, each set of (x,y) coordinates corresponding to an image frame of the video data; transform each particle center of each image frame to an expected particle center in a common coordinate frame; group the transformed particle centers into cluster centers; and calculate the particle count based on the number of cluster centers.

The processor 14 may be in communication with and/or include a memory. The memory can be, for example, a Random-Access Memory (RAM) (e.g., a dynamic RAM, a static RAM), a flash memory, a removable memory, and/or so forth. In some instances, instructions associated with performing the operations described herein (e.g., operate an image sensor, generate a reconstructed image) can be stored within the memory and/or a storage medium (which, in some embodiments, includes a database in which the instructions are stored) and the instructions are executed at the processor.

In some instances, the processor includes one or more modules and/or components. Each module/component executed by the processor can be any combination of hardware-based module/component (e.g., a field-programmable gate array (FPGA), an application specific integrated circuit (ASIC), a digital signal processor (DSP)), software-based module (e.g., a module of computer code stored in the memory and/or in the database, and/or executed at the processor), and/or a combination of hardware- and software-based modules. Each module/component executed by the processor is capable of performing one or more specific functions/operations as described herein. In some instances, the modules/components included and executed in the processor can be, for example, a process, application, virtual machine, and/or some other hardware or software module/component. The processor can be any suitable processor configured to run and/or execute those modules/components. The processor can be any suitable processing device configured to run and/or execute a set of instructions or code. For example, the processor can be a general purpose processor, a central processing unit (CPU), an accelerated processing unit (APU), a field-programmable gate array (FPGA), an application specific integrated circuit (ASIC), a digital signal processor (DSP), and/or the like.

Some instances described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other instances described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, instances may be implemented using Java, C++, .NET, or other programming languages (e.g., object-oriented programming languages) and development tools. Additional examples of computer code include, but are not limited to, control signals, encrypted code, and compressed code.

In another aspect, the present disclosure may be embodied as a non-transitory computer-readable medium having stored thereon a computer program for instructing a computer to perform any of the methods disclosed herein. For example, a non-transitory computer-readable medium may include a computer program to obtain a set of (x,y) coordinates corresponding to particle centers in video data, the video data comprising a sequence of image frames, and each set of (x,y) coordinates corresponding to an image frame of the video data; link a coordinate of each particle in each pair of consecutive image frames by fitting the coordinates to a statistical model of particle displacements; track a trajectory of each particle through links in each sequential image frame until the particle is not linked in a next image frame; calculate a length of the tracked particle trajectory; and calculate a particle count based on the tracked particle trajectories.

In another example, a non-transitory computer-readable medium may include a computer program to obtain a set of (x,y) coordinates corresponding to particle centers in video data, the video data comprising a sequence of image frames, and each set of (x,y) coordinates corresponding to an image frame of the video data; transform each particle center of each image frame to an expected particle center in a common coordinate frame; group the transformed particle centers into cluster centers; and calculate the particle count based on the number of cluster centers.

Although the present disclosure has been described with respect to one or more particular embodiments, it will be understood that other embodiments of the present disclosure may be made without departing from the spirit and scope of the present disclosure.

What is claimed is:

1. A method, comprising:
   obtaining a set of (x, y) coordinates corresponding to particle centers in video data of a set of particles within a fluid, the video data comprising a sequence of image frames and each set of (x, y) coordinates corresponds to an image frame;
   transforming coordinates of each particle center of each image frame to expected coordinates of a respective expected particle center in a common image frame;
   grouping the expected coordinates of the expected particle centers into cluster centers; and
   calculating a particle count based on the number of cluster centers.

2. The method of claim 1, wherein transforming each particle center comprises computing a transform to describe particle displacement between consecutive image frames.

3. A system, comprising:
a flow cell through including a fluid passage;
a lens-free image sensor for obtaining a holographic image of a fluid in the fluid passage;
a processor in communication with the image sensor, the processor programmed to:
  capture video data of particles within the fluid using the image sensor, the video data comprising a sequence of image frames;
  obtain a set of (x, y) coordinates corresponding to particle centers in the video data, each set of (x, y) coordinates corresponding to an image frame of the sequence of image frames;
  transform coordinates of each particle center of each image frame to expected coordinates of a respective expected particle center in a common image frame;
  group the expected coordinates of the expected particle centers into cluster centers; and
  calculate a particle count based on the number of cluster centers.

4. The system of claim 3, wherein the image sensor is a lens-free image sensor.

5. The system of claim 3, further comprising a coherent light source for illuminating at least a portion of the fluid passage.

6. A non-transitory computer-readable medium having stored thereon a computer program for instructing a computer to:
  obtain a set of (x, y) coordinates corresponding to particle centers in video data of a set of particles within a fluid, the video data comprising a sequence of image frames, and each set of (x, y) coordinates corresponding to an image frame of the video data;
  transform coordinates of each particle center of each image frame to expected coordinates of a respective expected particle center in a common image frame;
  group the expected coordinates of the expected particle centers into cluster centers; and
  calculate a particle count based on the number of cluster centers.

* * * * *